3,047,469
DEHYDROGENATION OF STEROIDS BY DEHYDROGENASE AND HYDROGEN CARRIER
Charles John Sih, New Brunswick, and Ralph E. Bennett, Princeton, N.J., assignors to Olin Mathieson Chemical Corporation, New York, N.Y., a corporation of Virginia
No Drawing. Filed July 8, 1959, Ser. No. 825,668
6 Claims. (Cl. 195—51)

This invention is concerned with a new and useful procedure for the selective dehydrogenation of steroids in the A ring. More specifically, this invention relates to procedures for dehydrogenating the A ring of steroids having A rings which are fully or partially saturated in that ring.

It is known to introduce unsaturations into the steroid molecule using the selective dehydrogenating activity of various microorganisms by contacting a quantity of the steroid with a living culture of the microorganism and allowing the living cells to remain in contact therewith until the dehydrogenation has been completed. It is known that such processes are highly advantageous over the synthetic methods for obtaining desired unsaturates and yet they possess certain disadvantages which severely restrict their usefulness, such as the inflexibility concomitant with the use of a living microorganism; the inability of the living cells to absorb certain molecules, a prerequisite to their dehydrogenating action; the inconvenience and cost of maintaining proper cultural conditions; the necessity of using an aqueous solvent as a dehydrogenating medium (steroids being only slightly soluble in water); and accompanying side reactions.

It is an object of this invention to provide a means for advantageously dehydrogenating steroids in the A ring while at the same time avoiding all the disadvantages which accompany the use of living microorganisms.

This and other objects are accomplished in accordance with this invention by a process which comprises subjecting a steroid which is saturated in the 1,2-position to the action of a mixture of (1) a ring A dehydrogenase extract of a microorganism selected from the group consisting of those strains of Nocardia, Corynebacterium, Mycobacterium, Cylindrocarpon and Bacterium, which dehydrogenate 1,2-saturated steroid in the 1,2-position said extract being substantially free of living cells, and being herein called ring A dehydrogenase; and (2) a hydrogen carrier which is a hydrogen acceptor. When contacted with the mixture of the ring A dehydrogenase and the carrier a $\Delta^4$-steroid will be converted to a $\Delta^{1,4}$-steroid and a steroid which is completely saturated in the A ring will be converted to the corresponding $\Delta^4$- or $\Delta^{1,4}$-unsaturate. The process of this invention provides an efficient means for converting a steroid to its A-ring unsaturated form without the disabilities associated with the use of living microrganisms. Moreover, one can selectively prepare either the $\Delta^1$-steroid or the $\Delta^4$ steroid from the corresponding A-ring saturated steroid by separating the $\Delta^1$- and $\Delta^4$-dehydrogenases from each other and subjecting the steroid to the action of the single dehydrogenase in combination with the hydrogen carrier.

Any steroid which is saturated in the 1,2-position may be used as a starting material in the dehydrogenation process of this invention and of course the starting material may be additionally saturated in the 4,5-position. Included among the steroids which are utilizable as starting materials in the process of this invention are androstanes (including androstenes and androstadienes), pregnanes (including allopregnanes, pregnenes and pregnadienes), and cholestanes (including cholestenes and cholestadienes). Examples of such steroids include androstanes such as testosterone, 19-nor-testosterone, androstane-3,17-dione, $\Delta^{4,6}$-androstadiene-3,20-dione, 9$\alpha$-fluoro-11$\beta$-hydroxy-testosterone, 9$\alpha$-fluoro-11$\beta$-hydroxy-17$\alpha$-methyltestosterone, and 9$\alpha$-fluoro-17$\alpha$-methylandrostane-11$\beta$,17$\beta$-diol-3-one; pregnanes, such as 11$\beta$,17$\alpha$,21-trihydroxy-3,20-diketopregnane, allopregnane-3,20-dione, pregnane-3,20-dione, pregnenolone, hydrocortisone, cortisone, 9$\alpha$-halocortisone, 9$\alpha$-halohydrocortisone, 9$\alpha$-halo-16$\alpha$-hydroxy-hydrocortisone, 6$\alpha$-methylhydrocortisone, 6$\alpha$-methyl-9$\alpha$-halo-16$\alpha$-hydroxy-hydrocortisone, 6-halohydrocortisone, 6,9$\alpha$-dihalohydrocortisone, 11$\alpha$-hydroxyprogesterone, Reichstein's Compound S, $\Delta^{9(11)}$-dehydro-Compound S, 19-nor-progesterone, progesterone, 17$\alpha$-hydroxyprogesterone, and 11-desoxycorticosterone; and cholestanes, such as $\Delta^4$-cholesten-3-one; and esters of those compounds containing a 21-hydroxyl group.

The ring A-dehydrogenase of this invention is obtained from living cultures of strains of microorganisms of the group consisting of Nocardia [e.g., the dehydrogenating species of Group I (Bergey) exemplified by *N. corallina*, *N. coeliaca*, *N. globerula*, and *N. aurantia*, Corynebacterium (e.g., *simplex*), Mycobacterium (e.g., *rhodochrous*), Cylindrocarpon (e.g., *radicicola*) and Bacterium (e.g., *cyclo-oxydans*)], which dehydrogenate 1,2-saturated steroids in the 1,2-position. The living cell-free-dehydrogenase compositions are prepared by treating a growing culture of a ring A-dehydrogenase-producing-microorganism of the above named group in such a manner as to substantially destroy all the living cells. If it is desired, prior to destroying the cells, the whole culture may be finely ground (e.g., with alumina) and then treated by known methods for cell destruction such as autolysis, lysozyme (and other enzymic) digestion methods, grinding, freezing and thawing, sonic disintegration, shaking with solvents such as acetone, shaking with fine glass beads, and, finally, explosion by sudden release of pressure. The thus obtained ring A-dehydrogenase-containing extract may be used as such or it may be subjected to purification procedures to concentrate it and/or separate it into its $\Delta^1$- and $\Delta^4$-dehydrogenase components (if both such components are present). If desired, it can be subjected to solvent fractionation procedures using such water-miscible solvents as acetone, ethanol, methanol and dioxane, or other purification procedures such as solvent-metal ion fractionation, adsorption, adsorption chromatography, ion exchange chromatography, or partition chromatography. The ring A dehydrogenase containing composition may be used in the form of an aqueous solution or as an organic solution with solvents such as acetone or dimethylformamide. The hydrogen carriers which are used in accordance with this invention, with the ring A-dehydrogenase obtained above, are oxidation-reduction reagents (e.g., dyes) such as potassium ferricyanide; thiazines and imine derivatives as exemplified by methylene blue, phenazine methosulfate, phenazine ethosulfate, toluidine blue, and resazurin; benzoquinones and imine derivatives as exemplified by o-quinone, toluylene blue chloride, and phoenicin; naphthoquinones and imine derivatives as exemplified by 5-hydroxy-1,4-naphthaquinone; oxazines as exemplified by cresyl blue and brilliant cresyl blue; and indophenols as exemplified by 2-sulfo-1-naphtholindo-3,5'-dichlorophenol, 2-sulfo-1-naphtholindo-2,6-dichlorophenol, 2-sulfo-1-naphtholindophenol, m-toluene diamine indophenol chloride, 2-sulfo-1-naphtholindophenol 3-sulfonic acid, thymolindophenol, 2,6-dichlorophenol-indo-o-cresol, o-cresol-indophenol, m-cresol indophenol, 2,6-dibromophenol-indophenol, 2,6-dichlorophenol indophenol, 2,6-dichlorophenol-indo-o-chlorophenol, phenol blue chloride, o-bromophenol indophenol, o-chlorophenol indophenol, 2-sulfophenol-indo-2',6'-dibromophenol, m-bromophenol indophenol, 3-sulfophenol indophenol, m-chlorophenolindo-2,6-dichlorophenol, and 3-sulfophenol indo-2',6'-dibromophenol.

To proceed in accordance with this invention a living culture of the ring A-dehydrogenase-producing microorganism from the group consisting of Nocardia, Corynebacterium, Mycobacterium, Cylindrocarpon and Bacterium is grown using conventional means. Thus a sample of the living culture may be transferred from an agar slant to a flask containing the proper nutrient media containing a source of carbon energy and organic nitrogen. Suitable media are exemplified by the following.

A. Corn steep medium (CSM):
  Corn steep liquor _____ 6 gms./liter.
  $NH_4H_2PO_4$ _____ 3 gms./liter
  $CaCO_3$ _____ 2.5 gms./liter
  Soybean oil _____ 2.2 gms./liter
  Steroid.
  Distilled water to 1 liter, pH 7.0.
    Sterilize at 15 p.s.i.g. for 30 minutes,
    and then add
  Yeast extract _____ 2.5 gms.
  Dextrose _____ 10 gms.
B. Bacteria yeast fermentation medium:
  Peptone _____gms__ 5
  Tryptome _____gms__ 5
  Yeast extract _____gms__ 5
  Glucose _____gms__ 20
  $CaCO_3$ _____percent__ 0.25
  Distilled water to 1 liter. Sterilize at 15 p.s.i.g.
    for 20 minutes.

After being permitted to grow for the desired period of time, for example for twenty-four to seventy-two hours, the cells are harvested using any conventional procedures such as filtration or centrifugation. The harvested cells may be ground or otherwise treated by means directed to their destruction using any of the above named procedures. The ring A-dehydrogenase composition, devoid of living cells, may be used as such (as an aqueous crude preparation) or may be further purified and extracted with an organic solvent, in which solvent the ring A dehydrogenase may be used to treat the steroid starting material. When operating with a purified composition in an organic solvent it is preferable to use a solvent in which the steroid material is highly soluble, such as dimethylformamide. Solutions of enzyme may be used in any concentration, but it is preferred, for optimum results to adjust the enzyme concentration to at least equal the concentration of the steroid to be dehydrogenated.

The ring A-dehydrogenase cell-free extract may be mixed directly with the steroid starting material (and the hydrogen carrier then added to the mixture) or else it may be initially mixed with the hydrogen carrier and then contacted with the steroid. The concentration of hydrogen carrier is not critical. Since the dehydrogenation reaction is almost stoichiometrical, the concentration of some of the carriers may be approximately equal to the concentration of the steroid. This, however, is not necessary in crude preparations where only catalytic amounts of carriers are required. The pH and temperature prevailing during dehydrogenation are not critical. Temperatures may be in the range of 20°–45° C., the optimum being around 25° C. to 35° C. The pH may be acid, alkaline or neutral, and preferably is within the range of 6.0 to 8.0. If it is desired to maintain the pH at a certain value, a buffering material such as an inorganic phosphate (e.g., sodium phosphate) may be incorporated into the reaction mixture. The reaction mixture is permitted to stand for a suitable period until ring A-dehydrogenation has been effected. Reaction normally proceeds to substantial completion within periods of one to twenty hours.

The ring A-unsaturated steroid which is the final product, may be separated from the reaction product by conventional extraction procedures such as by treating the product with chloroform or methyl isobutyl ketone, the steroid separating into the organic phase.

The following examples are presented to more fully illustrate the invention.

EXAMPLE I

A. *Preparation of Cell-Free Enzyme Mixture*

A 3 ml. sample of a culture of *Nocardia aurantia* (ATCC 12,674) on an agar slant containing 10 ml. of medium A (corn steep medium) is used to inoculate a 500 ml. flask containing 100 ml. of the same medium A. The culture is permitted to incubate with shaking and agitation at a temperature of 27° C. After 48 hours, a 2.5 ml. portion is extracted and this is used to inoculate a 500 ml. flask containing 100 ml. of the same medium A. The cells are cultured at 27° C., with shaking and agitation, and after 72 hours the cells of the growing culture are harvested by centrifugation of the culture for ten minutes at 2000× G. The supernatant is decanted off and the remaining cells are placed in a mortar along with an equal amount by weight of alumina (finely powdered) and treated in a magnetostrictive oscillator for 20 minutes. The comminuted mixture is centrifuged for ten minutes at 2000× G resulting in the separation of the cell debris and alumina, which is discarded, from the supernatant which is saved for use as the source of the ring A-dehydrogenase enzymes in the subsequent dehydrogenations.

B. *Preparation of Cell-Free Enzyme Extract*

Twenty ml. of the sonicate of Example I–A is centrifuged for 30 minutes at 100,000× G. The supernatant having a concentration of 3.0 mg./ml. of ring A-dehydrogenase enzyme is retained for use in subsequent dehydrogenations.

EXAMPLE II

A. *Preparation of Cell-Free Enzyme Mixture*

A culture of *Bacterium cyclo-oxydans* ATCC 12,673 is transferred from an agar slant containing 50 ml. of medium B (bacteria-yeast fermentation medium) and 25 mg. of progesterone (i.e., 500 gamma of progesterone per ml. of nutrient medium) to a 250 ml. flask containing 50 ml. of the same medium B with 500 gamma of progesterone per ml. of medium. The culture is permitted to develop in the flask by maintaining it for 72 hours at 27° C. with shaking and agitation, after which time the cells are separated out by centrifugation for 10 minutes at 2000× G. The living cell-mixture remaining from centrifugation is buffered with 40 ml. of 0.03 M sodium phosphate and sonicated in a Raytheon magnetostrictive oscillator (10 kc.) for twenty minutes, after which time the cell debris (i.e., the insoluble, disintegrated cell structure) is removed by centrifugation at 2000× G leaving the supernatant (sonicate) which contain ring A-dehydrogenase enzymes.

B. *Preparation of Cell-Free Enzyme Extract*

Twenty ml. of the sonicate of Example II–A is centrifuged for 30 minutes at 100,000× G. The resulting supernatant is retained for use as a source of ring A-dehydrogenase enzyme in subsequent dehydrogenations.

In a manner similar to that of Examples I and II the ring A-dehydrogenase enzymes of *Corynebacterium simplex, Mycobacterium rhodochrous* and *Cylindrocarpon radiciola* are obtained.

EXAMPLE III $\Delta^{1,4}$-*Cholestedien-3-One*

$\Delta^4$-cholestedien-3-one (1 mg.), resazurin (500 gamma) and 2.0 ml. of the cell-free ring A-dehydrogenase enzyme extract of Example I–B are placed in a small vessel and brought to a volume of 5.0 ml. with a 0.03 M sodium phosphate buffer. The mixture is permitted to stand for about one hour at 30° C. after which it is twice extracted with 1 ml. of methyl isobutyl ketone and the combined extract is paper chromatographed using a conventional Carbitol-chloroform system. Upon development of the paper chromatogram with methylcyclohexane, $\Delta^{1,4}$-cholestedien-3-one is noted, establishing successful $\Delta^{1}$-dehydrogenation.

EXAMPLE IV

Progesterone

Exactly as in Example III but substituting pregnane-3,20-dione (1 mg.) for the cholestenone, a product is obtained which upon methyl isobutyl ketone extraction and paper chromatography as in Example III is proven to contain progesterone and $\Delta^{1,4}$-pregnadiene-3,20-dione.

EXAMPLE V

$\Delta^{1}$-Testosterone

The procedure of Example III is repeated using testosterone (1 mg.) instead of cholestenone and 2.0 ml. of the ring A-dehydrogenase of Example II–B. After one hour the mixture is twice extracted with 1 ml. portions of methyl isobutyl ketone and the extract is paper chromatographed. The development with a toluene-propylene glycol system of the paper chromatogram indicates the presence of $\Delta^{1}$-testosterone in the extract.

EXAMPLE VI

$6\alpha,9\alpha$-Difluoro-$16\alpha$-Hydroxy-Prednisolone 1 mg. of $6\alpha,9\alpha$-difluoro-$16\alpha$-hydroxy-hydrocortisone, 0.5 ml. of dimethylformamide 2.0 ml. of the enzyme of Example II–B and 1 mg. of methylene blue are placed in a 30 ml. test tube and the mixture is adjusted to a total volume of 5.0 ml. by the addition of a 0.03 M sodium phosphate buffer. The pH of the mixture is 7.1. The mixture is kept on a water bath at 30° C. for 1 hour after which the reaction product is twice extracted with methyl isobutyl-ketone. The extracts are pooled and paper chromatographed using a conventional benzene-ethanol-water system for 18 hours, yielding a spot having the same mobility as an authentic sample of $6\alpha,9\alpha$-difluoro-$16\alpha$-hydroxy-prednisolone.

EXAMPLE VII

$\Delta^{1,4}$-Pregnadiene-3,20-Dione

In order to show the rate of $\Delta^{1}$-dehydrogenation of progesterone, six 30 ml. test tubes are each separately charged with 500 gammas of progesterone, 500 gammas of methylene blue and 2.0 ml. of the ring A-dehydrogenase mixture of Example II–B. The total volume in each tube is brought to 5.0 ml. by the addition of a 0.03 M sodium phosphate buffer. At time intervals of 0, 5, 15, 30, 45 and 60 minutes, each of the test tubes is thrice extracted with 1.5 ml. of methyl isobutyl ketone and the extracts from each test tube are separately pooled. Samples (0.5 ml.) of each are spotted on Whatman No. 1 paper (washed with 95% ethanol) in a methylcyclohexane-carbitol system for about 16 hours. The ultraviolet absorbing spots are eluted with 95% ethanol and the eluate examined with a Beckman spectrophotometer (set for 240 m$\mu$ and using progesterone as the standard). The concentrations of progesterone and $\Delta^{1,4}$-pregnadiene-3,20-dione at the respective time intervals are indicated in Table 1.

TABLE I

| Time (minutes) | Progesterone (micromoles) | $\Delta^{1,4}$-Pregnadiene-3,20-dione (micromoles) |
| --- | --- | --- |
| 0 | 1.44 | |
| 5 | 1.24 | 0.19 |
| 15 | 0.72 | 0.51 |
| 30 | 0.24 | 0.96 |
| 45 | 0.14 | 1.15 |
| 60 | | 1.53 |

EXAMPLE VIII

$\Delta^{1}$-Testosterone 700 gammas of testosterone, 500 gammas of potassium ferricyanide, 2.0 ml. of enzyme preparation of Example I–B plus enough 0.03 M sodium phosphate solution to obtain a volume of 5.0 ml. are contacted in a 30 ml. test tube at 25° C. After 60 minutes the mixture is extracted with 1 ml. of methyl isobutyl ketone and spotted on Whatman No. 1 paper and developed for three hours in a toluene-propylene glycol system. Chromatography showed an absorbing spot having identical mobility as the spot from an authentic sample of $\Delta^{1}$-testosterone.

The procedure of Example VIII is twice repeated using 1 mg. of 2,6-dichlorophenol-indophenol and 500 gammas of methylene blue, respectively, in place of the ferricyanide of Example VIII. Chromatography of each of the products yields an absorbing spot having identical mobility as the spot from an authentic sample of $\Delta^{1}$-testosterone.

EXAMPLE IX

$9\alpha$-Fluoro-$16\alpha$-Hydroxy-Prednisolone (Triamcinolone)

To 100 mg. of $9\alpha$-fluoro-$16\alpha$-hydroxy-hydrocortisone dissolved in 1 ml. of dimethylformamide is added 100 mg. of 2,6-dichlorophenol-indophenol and 100 ml. of the enzyme preparation of Example II–B. The total volume is adjusted with water to 200 ml. and the mixture is maintained at 30° C. After 16 hours the reaction mixture is thrice extracted with methyl isobutyl ketone (50 ml.) and then centrifuged to break the emulsion. The supernatant and the methyl isobutyl ketone extracts are combined and concentrated to dryness. The residue (about 450 mg.) is chromatographed on a column of celite as follows:

To a 1.6 x 34 cm. column containing 25 gms. of Celite is added 12 ml. of solvent comprising dioxane, cyclohexane and water in a ratio of 5:4:1. The sample is dissolved in 6 cc. of solvent, mixed with 6 mg. of Celite and then added to the column. Eighty 12.5 ml. fractions are collected by passing the solvent through the column at the rate of 5 ml. per minute. One-tenth ml. portions of the collected fractions are treated with 0.2 ml. of arseno molybdate reagent in a total volume of 3.0 ml., the samples being heated for 20 minutes at 100° C. with the reagent. Fractions 42–62 are pooled and evaporated to dryness yielding about 85.6 mg. of a product which is dissolved and recrystallized from 95% ethanol, 30 mg. of pure white crystals are obtained. The crystals, dissolved in Nujol yield an infra-red absorption spectrum which is identical with that of triamcinolone, and typical of the $\Delta^{1,4}$-3 ketone bands. The product shows a U.V. maximum in alcohol at 238 m$\mu$ ($E^{1\%}$=389).

EXAMPLE X

Progesterone and $\Delta^{1,4}$-Pregnadiene-3,20-Dione 200 mg. of pregnane-3,20-dione in 5.0 ml. of dimethylformamide is added to a flask containing 150 ml. of enzyme extract of Example II–B and 200 mg. of 2,6-dichlorophenolindophenol. The total volume of the mixture is adjusted to a volume of 400 ml. by the addition of 0.03 M sodium phosphate buffer at pH 7.0. The mixture is permitted to incubate for a period of twelve hours at a temperature of 25° C., and the resulting reaction product is then extracted with five successive 100 ml. portions of methyl isobutyl ketone. The combined extracts are evaporated in vacuo and the residue added to a cellulose powder column (1.6 x 24 cm.) in which propylene glycol is the stationary phase and hexane is the mobile phase. The rate of flow is adjusted to equal 1 ml. per minute and successive 3 ml. portions are collected in separate tubes. Two major peaks are noted in tubes 6–15 and tubes 17–28. The portions from these tubes are separately pooled.

The combined eluate of tubes 6–15 is crystallized from a 1:1 hexane-ethylacetate mixture. The crystals are filtered off and dried in vacuo and then over $MgSO_4$. The yield is about 5 mg. of needlelike crystals (melting at about 121° C.), showing a U.V. maximum in alcohol at 241 m$\mu$ ($E^{1\%}$=505) and infra-red absorption typical of 3,20-dione-4,5 double bond configuration and identical with that of progesterone.

The combined eluate of tubes 17–28 is crystallized from a 1:1 methylcyclohexane-ethylacetate mixture and the crystals are filtered off, dried in vacuo and then dried over $MgSO_4$. The yield is about 90 mg. of crystals (melting at about 150–151° C.) showing a U.V. maximum in alcohol at 244 m$\mu$ ($E^{1\%}$=500) and infra-red absorption peaks (in Nujol) at 5.80 m$\mu$, 6.04 m$\mu$, 6.17 m$\mu$ and 6.26 m$\mu$, typical of the $\Delta^{1,4}$-3,20-dione configuration and identical with that of $\Delta^{1,4}$-pregnadiene-3,20-dione.

In the same manner as in Example X progesterone and allopregnane-3,20-dione can readily be dehydrogenated in the A ring of the respective steroid nuclei. In each case, characterization by paper chromatography, melting point determination, infra-red and ultraviolet analysis proves the presence of $\Delta^{1,4}$-pregnadiene-3,20-dione in the dehydrogenation product.

This invention may be otherwise embodied within the scope of the appended claims.

What is claimed is:

1. A process for dehydrogenating steroids in the A-ring which comprises subjecting a 1,2-saturated steroid to the action of a mixture of (1) a hydrogen carrier and (2) a ring A dehydrogenase which is a cell-free extract of a 1,2-dehydrogenating strain of a microorganism selected from the group consisting of Nocardia, Corynebacterium, Mycobacterium and Cylindrocarpon; and recovering the ring A-dehydrogenated-steroid thus formed.

2. The process of claim 1 wherein the ring A-dehydrogenase is obtained from a 1,2-dehydrogenating strain of Nocardia.

3. The process of claim 2 in which the steroid starting material is testosterone.

4. The process of claim 2 in which the steroid starting material is progesterone.

5. The process of claim 2 in which the steroid starting material is 9$\alpha$-fluoro-16$\alpha$-hydroxy-hydrocortisone.

6. The process of claim 2 in which the hydrogen carrier is 2,6-dichlorophenol-indophenol.

References Cited in the file of this patent

UNITED STATES PATENTS

| | | |
|---|---|---|
| 2,822,318 | Kroll et al. | Feb. 4, 1958 |
| 2,831,876 | Shull et al. | Apr. 22, 1958 |
| 2,833,797 | Hershberg | May 6, 1958 |
| 2,837,464 | Nobile | June 3, 1958 |
| 2,868,694 | Fried et al. | Jan. 13, 1959 |

OTHER REFERENCES

Porter: Bacterial Chemistry and Physiology, 1946, published by John Wiley & Sons, Inc., pp. 540–41 and 558–566.